US010202956B2

(12) United States Patent
Klein et al.

(10) Patent No.: US 10,202,956 B2
(45) Date of Patent: Feb. 12, 2019

(54) METHOD FOR STARTING AN INTERNAL COMBUSTION ENGINE WITH THE AID OF A BELT-DRIVEN STARTER GENERATOR

(71) Applicant: SEG Automotive Germany GmbH, Stuttgart (DE)

(72) Inventors: Benjamin Klein, Bietigheim-Bissingen (DE); Martin Henger, Tamm (DE)

(73) Assignee: SEG AUTOMOTIVE GERMANY GMBH, Stuttgart (DE)

(*) Notice: Subject to any disclaimer, the term of this patent is extended or adjusted under 35 U.S.C. 154(b) by 135 days.

(21) Appl. No.: 14/820,275

(22) Filed: Aug. 6, 2015

(65) Prior Publication Data

US 2016/0065107 A1 Mar. 3, 2016

(30) Foreign Application Priority Data

Sep. 2, 2014 (DE) .................. 10 2014 217 455

(51) Int. Cl.
*F02N 11/08* (2006.01)
*H02P 9/08* (2006.01)
*F02B 67/06* (2006.01)
*F01B 27/02* (2006.01)
*F02N 11/04* (2006.01)
*F02N 15/08* (2006.01)
*F16H 7/08* (2006.01)

(52) U.S. Cl.
CPC .............. *F02N 11/08* (2013.01); *F01B 27/02* (2013.01); *F02B 67/06* (2013.01); *F02N 11/04* (2013.01); *F02N 15/08* (2013.01); *F16H 2007/0885* (2013.01)

(58) Field of Classification Search
CPC .......... F02N 11/04; F02N 11/08; F02N 15/08; F02N 2200/041; F02N 2200/042; F02N 2300/104; F02B 27/02; F02B 67/06; F16H 2007/0885
USPC ...... 123/179.1, 179.28, 179.3; 701/102, 113; 290/31; 474/10
See application file for complete search history.

(56) References Cited

U.S. PATENT DOCUMENTS

| | | | | |
|---|---|---|---|---|
| 2002/0062806 A1* | 5/2002 | Suzuki | .................. | B60W 10/08 123/179.3 |
| 2002/0123401 A1* | 9/2002 | Henry | .................. | F01L 1/34 474/101 |

(Continued)

FOREIGN PATENT DOCUMENTS

| | | |
|---|---|---|
| DE | 60110528 T2 | 1/2006 |
| DE | 102012203374 A1 | 9/2013 |

(Continued)

*Primary Examiner* — John Zaleskas
(74) *Attorney, Agent, or Firm* — Norton Rose Fulbright US LLP; Gerard A. Messina

(57) ABSTRACT

A method for starting an internal combustion engine using a starter generator to which the engine is connected via a belt drive, the belt drive including a belt pulley of the starter generator, a belt pulley of the internal combustion engine, and a belt connecting the belt pulleys in a torque-transmitting manner, includes operating the starter generator such that its drive torque output to the belt pulley of the starter generator is according to a drive torque curve by which an output torque generated temporarily on the belt pulley of the internal combustion engine exceeds the drive torque of the starter generator, taking a gear ratio of the belt drive into consideration.

18 Claims, 3 Drawing Sheets

(56) References Cited

U.S. PATENT DOCUMENTS

| | | | | |
|---|---|---|---|---|
| 2004/0133333 A1* | 7/2004 | Surewaard | ............ | F02D 41/042 |
| | | | | 701/99 |
| 2006/0017290 A1* | 1/2006 | Murty | ...................... | F02N 11/04 |
| | | | | 290/36 R |
| 2008/0318729 A1* | 12/2008 | Asao | ...................... | B60K 6/485 |
| | | | | 477/5 |
| 2009/0212569 A1* | 8/2009 | Bauer | .................. | F02N 11/006 |
| | | | | 290/47 |
| 2010/0283243 A1* | 11/2010 | Armiroli | ................. | F02N 11/04 |
| | | | | 290/31 |
| 2012/0259535 A1* | 10/2012 | Jaros | ........................ | F02N 11/04 |
| | | | | 701/113 |
| 2012/0298062 A1* | 11/2012 | Granziera | .............. | F02N 11/04 |
| | | | | 123/179.3 |
| 2014/0130635 A1* | 5/2014 | Kees | ..................... | F02N 11/006 |
| | | | | 74/7 R |
| 2014/0265332 A1* | 9/2014 | Jaros | ..................... | F02N 11/006 |
| | | | | 290/48 |
| 2015/0144099 A1* | 5/2015 | Straker | ................... | F02N 11/04 |
| | | | | 123/339.14 |
| 2015/0226171 A1* | 8/2015 | Kees | ...................... | B60K 6/485 |
| | | | | 290/31 |
| 2017/0307060 A1* | 10/2017 | Klein | .................... | F16H 7/1281 |

FOREIGN PATENT DOCUMENTS

| | | | | |
|---|---|---|---|---|
| EP | 1760297 | A2 | | 3/2007 |
| JP | 2003328911 | A | * | 11/2003 |
| JP | 2004346834 | A | * | 12/2004 |
| JP | 2007292079 | A | * | 11/2007 |

* cited by examiner

METHOD FOR STARTING AN INTERNAL COMBUSTION ENGINE WITH THE AID OF A BELT-DRIVEN STARTER GENERATOR

FIELD OF THE INVENTION

The present invention relates to a method for starting an internal combustion engine with the aid of a belt-driven starter generator, and to an arithmetic unit and a computer program for carrying out the method.

BACKGROUND

Electric machines may be used in motor vehicles as so-called starter generators in order to, on the one hand, start the internal combustion engine during motor operation of the electric machine and, on the other hand, to generate power for the vehicle electrical system and for charging the motor vehicle battery during generator operation of the electric machine. Starter generators may be connected to the internal combustion engine or the crankshaft via a belt drive.

In particular, separately excited three-phase synchronous machines are suitable for use as belt-driven starter generators (BSG) since their motor-based torque is particularly easy to control. A desirable torque may be set by appropriate control of the rotor winding (excitation coil) and/or the stator winding (e.g., three or five stator phases are common). A modulation of the torque over time may be preferred to achieve a preferably low-noise and low-vibration starting process.

To start the internal combustion engine, the drive torque of the starter generator is transmitted via the belt to the crankshaft of the internal combustion engine, in order to accelerate the crankshaft to a minimum rotational speed. Once the minimum rotational speed has been reached, a combustible mixture in the combustion chamber is ignited at a defined point in time.

To start the internal combustion engine, powerful starter generators must be used, which are large, heavy, and expensive. It is therefore desirable to save space, weight, and costs.

SUMMARY

According to an example embodiment of the present invention, a method for starting an internal combustion engine with the aid of a belt-driven starter generator, in which an effective output torque on the crankshaft may be generated, includes predefining a certain drive torque curve (of drive torque vs. time) for the drive torque output by the starter generator, the output torque temporarily exceeding the transmitted (i.e., taking the gear ratio of the belt drive into consideration) drive torque of the starter generator.

The present invention allows an output torque to be generated on the crankshaft, where the output torque is temporarily greater than the transmitted drive torque of the starter generator, preferably by at least 10%, 20%, 30%, 40%, 50% or 60%. If the drive torque corresponds to the peak torque (i.e., maximum short-term torque), correspondingly an output torque can be generated on the crankshaft which is temporarily greater than the transmitted peak torque of the starter generator, and in particular can be used to overcome a breakaway torque of the internal combustion engine. The torque required to start the internal combustion engine is dependent, on the one hand, on the so-called breakaway torque and, on the other hand, on the compression torque required to overcome the compressions of the internal combustion engine. The breakaway torque is created on the crankshaft since the static friction must be overcome when transferring the resting system into a rotating system. It is known that the static friction is generally greater than the kinetic friction. Once the static friction has been overcome, the crankshaft "breaks" away (thus breakaway torque), and the torque required for further acceleration of the crankshaft thereafter drops.

With the aid of the present invention, it is possible to increase the output torque on the crankshaft beyond the transmitted peak torque of the starter generator by utilizing the dynamic properties of the belt drive. In this way, the breakaway torque of the crankshaft can be overcome even when the transmitted peak torque of the starter alone would not be sufficient. It is possible to save space, weight, and cost by using starter generators having a smaller peak torque.

An output torque which is increased beyond the transmitted drive torque is reached by accelerating the starter generator, during starting, using a certain drive torque curve. The drive torque curve is preferably predefined as a function of the first natural frequency or the first natural period duration of the belt drive, in particular in such a way that the acceleration duration, during which the drive torque on the belt pulley of the starter generator is increased from zero to the desired drive torque, corresponds at most to double, single, or half the first natural period duration.

DE 10 2012 203 374 A1 describes a method for pretensioning the belt prior to starting, the starter generator building torque gradually, and not abruptly as is customary. However, contrary to the present invention, the torque curve is not predefined there in such a way that the output torque is greater than the transmitted drive torque. Rather, acceleration is such that the belt tensions gradually.

The torque curve is preferably essentially (i.e., within the scope of customary tolerances) linear at least in sections, i.e., has a certain torque gradient (i.e., change of the torque per unit of time) or follows a torque ramp. Particularly preferably, the torque curve is essentially linear overall, i.e., between zero and the desired drive torque value.

An arithmetic unit according to the present invention, e.g., a control unit of a motor vehicle, is configured, in particular from a programming point of view, to carry out a method according to the present invention.

The implementation of the method in the form of software is also advantageous since this results in particularly low costs, in particular when an executing control unit is also used for additional tasks and is therefore present anyhow. Suitable data carriers for providing the computer program are in particular diskettes, hard disks, flash memories, EEPROMs, CD-ROMs, DVDs, and the like. It is also possible to download a program via computer networks (Internet, Intranet, and the like).

Further advantages and embodiments of the present invention are derived from the detailed description and the accompanying drawings. The above-mentioned features and those described below can be used, not only in the particular described combination, but also in other combinations, or alone, without departing from the scope of the present invention. The present invention is shown schematically based on one example embodiment in the drawings and is described in greater detail below with reference to the drawings.

DETAILED DESCRIPTION

Figure 1:
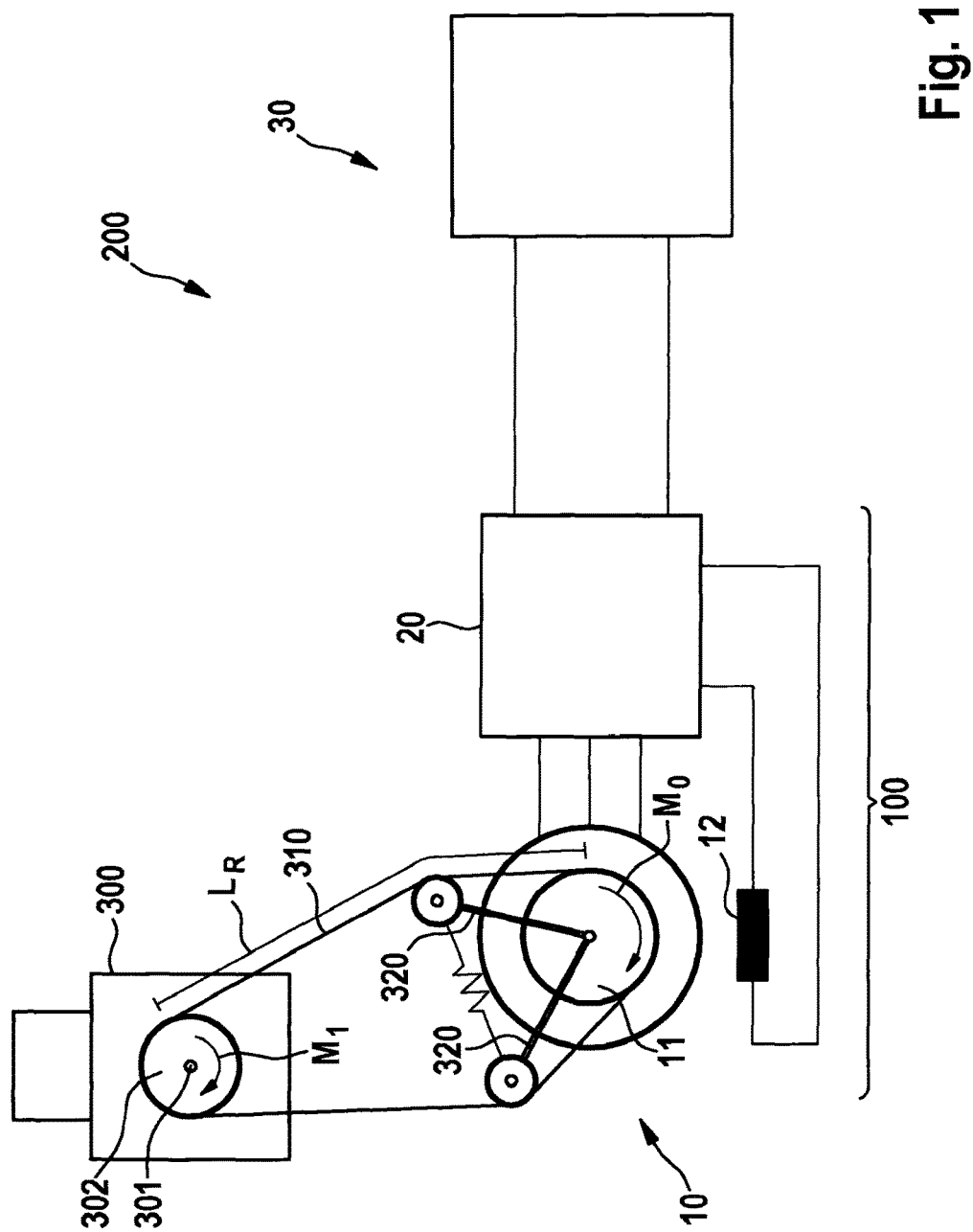
FIG. 1 schematically shows a system including an internal combustion engine, a belt-driven starter generator, and a vehicle electrical system, used in an example embodiment of the present invention.

FIG. 1 schematically shows a system 200 including an internal combustion engine 300, a belt-driven starter generator 100 as an electric machine, and a vehicle electrical system 30, based on which a preferred example embodiment of the present invention is described below.

The starter generator includes a generator component 10 and a power converter component 20. The power converter component is usually operated as a rectifier during generator operation of the machine, and as an inverter during motor operation.

Internal combustion engine 300 is equipped on its crankshaft 301 with a belt pulley 302 and connected via a belt 310 to a belt pulley 11 of starter generator 100, an (optional) belt tensioner designed as a reciprocating belt tensioning system 320 being provided here, which is able to tension belt 310 during operation independently of the direction of torque.

The belt drive, including belt pulley 302, belt pulley 11 and belt 310 usually designed as a V-belt or V-ribbed belt, provides an appropriate gear ratio i as a function of the circumferences of the belt pulleys. Correspondingly, a drive torque $M_0$ output from the starter generator 100 to belt pulley 11 is translated into an output torque $M_1=M_0*i$ output from belt pulley 302 to crankshaft 301, and vice versa.

To start internal combustion engine 300, starter generator 100 is operated as a motor. Electric drive torque $M_0$ of the starter generator 100 (see FIG. 2) is divided into the acceleration torque for overcoming the inertia of the rotating elements (rotor of the generator and belt pulley 11 of the belt drive connected thereto) and the torque which is introduced via belt pulley 11 into belt 310. Until the breakaway of crankshaft 301, belt 310 is tensioned as a result of its elasticity, and crankshaft 301 remains at rest. If the rotor having belt pulley 11 no longer absorbs any acceleration work, an overshooting of output torque $M_1$ occurs, as shown in FIG. 3, since the inertia of the rotating elements now in turn introduces a torque into the system.

Figure 2:
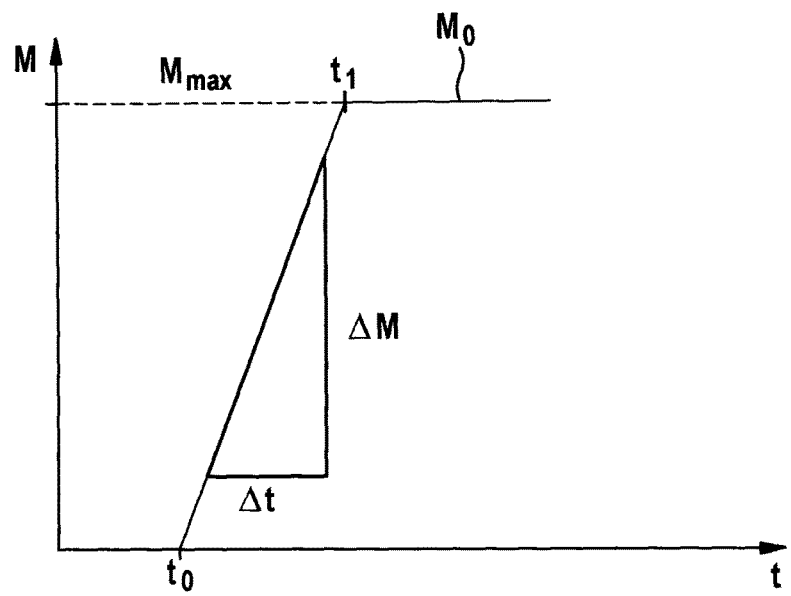
FIG. 2 shows an example drive torque curve generated by the starter generator on the belt pulley of the starter generator, according to an example embodiment of the present invention.

FIG. 2 shows a diagram of an example linear curve of drive torque $M_0$ of starter generator 100. Beginning at a point in time $t_0$, drive torque $M_0$ is linearly increased to the desired maximum drive torque value $M_{max}$ up until a point in time $t_1$. The desired drive torque value $M_{max}$ is the peak torque here, but can also be the maximum permanent torque. The slope, i.e., the torque gradient, determines the level of overshooting of output torque $M_1$, as shown in FIG. 3.

Figure 3:
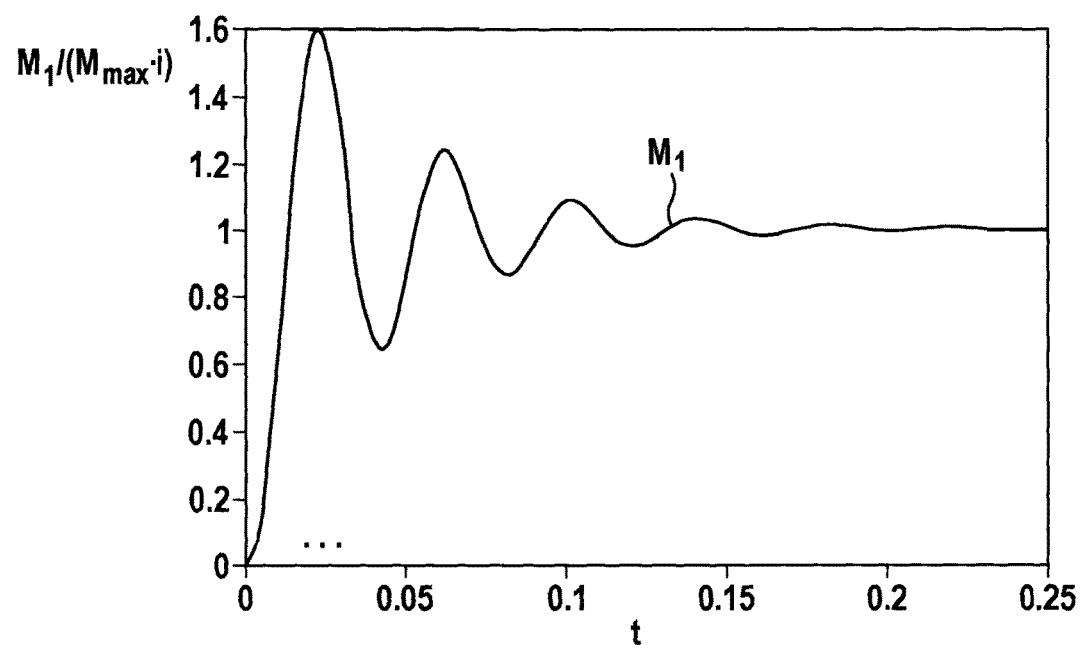
FIG. 3 shows an example drive torque curve on the crankshaft or belt pulley of the internal combustion engine, from the beginning of the starting process through the breakaway of the crankshaft, all the way to the subsequent acceleration process, according to an example embodiment of the present invention.

FIG. 3 shows a diagram of an example curve of output torque $M_1$ on crankshaft 301 of internal combustion engine 300 standardized to transmitted maximum drive torque $i*M_{max}$. Starting at point in time 0 (corresponds to $t_0$ in FIG. 2), output torque $M_1$ increases. Maximum drive torque $M_{max}$ is reached approximately at t=0.01 here. However, due to the dynamics of the belt drive, the output torque continues to increase and overshoots by up to approximately 1.6 times the transmitted drive torque ($i*M_{max}$). This is sufficient for the crankshaft to break away and accelerate. The output torque correspondingly decreases again and decays as a function of the damping of the system (belt drive together with internal combustion engine).

Figure 4:
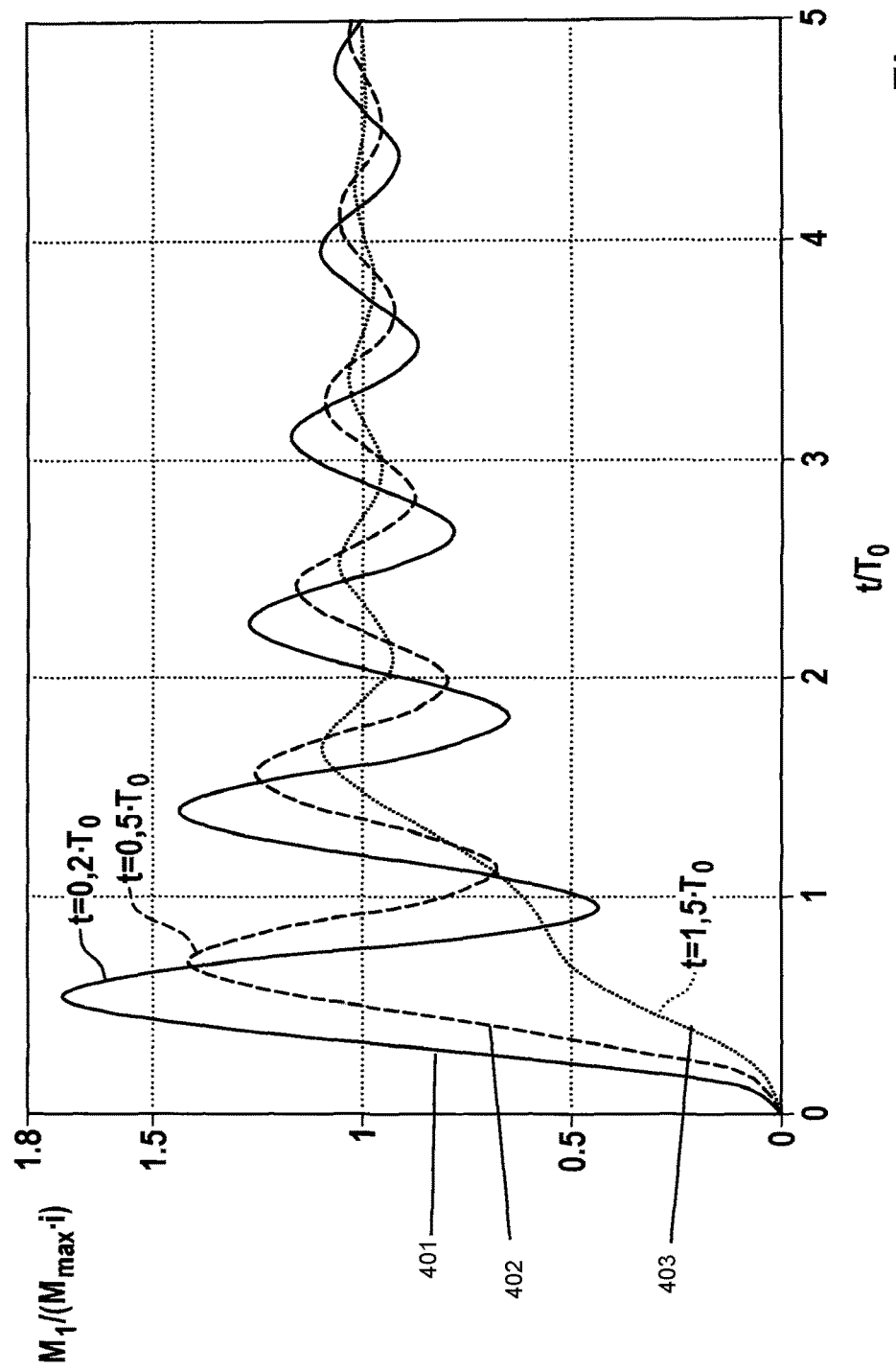
FIG. 4 shows different output torque curves on the crankshaft or belt pulley of the internal combustion engine, which result in different drive torque curves, according to an example embodiment of the present invention.

FIG. 4 shows three curves 401, 402 and 403 of output torque $M_1$, standardized to the transmitted maximum drive torque $i*M_{max}$, plotted against time t, standardized to the first natural period duration $T_0$ of the belt drive. Curve 401 corresponds to a torque gradient of $M_{max}/(0.2\ T_0)$, curve 402 corresponds to a torque gradient of $M_{max}/(0.5\ T_0)$, and curve 403 corresponds to a torque gradient of $M_{max}/(1.5\ T_0)$. It becomes apparent that the level of the overshooting decreases with the torque gradient, i.e., the stronger the acceleration, the higher is the achievable peak output torque. In particular, the torque gradient should thus be at least $M_{max}/(0.5\ T_0)$ for a linear drive torque curve. A preferred maximum torque gradient can be indicated, e.g., as $M_{max}/(0.5\ \mu s)$, since no significant increase in the peak output torque is to be expected with even greater acceleration, and engines that may be accelerated even more must be relatively robust, which in turn results in increased space requirement and costs. Moreover, such a sudden acceleration can prevent re-tensioning of a preferably used belt tensioner, and thus result in "slipping" of the V-ribbed belt, and thus in premature wear of the V-ribbed belt.

The excessive increase is dependent on different variables of the belt drive, which are meaningfully taken into consideration when predefining the drive torque curve, i.e., during control of the starter generator.

The main influencing variables on the excessive increase are:

length $L_R$ of the belt span between starter generator 100 and crankshaft 301 the axial rigidity $E*A$ of the belt used, E corresponding to the modulus of elasticity of the belt, and A corresponding to its cross-sectional surface moment of inertia $J_{RSG}$ of the rotor of the starter generator having belt pulley 11, and gradient $M_{max}/(t_1-t_0)$ of the drive torque.

In an example embodiment of the present invention, the acceleration duration $(t_1-t_0)$ is ≤twice the period duration $T_0$ of the first natural frequency of the belt drive. A lower limit for the acceleration duration $(t_1-t_0)$ can be 5 µm, for example, as was already mentioned above.

The first natural frequency of the belt drive depends on the above-mentioned parameters of the belt drive.

The moments of inertia of the crankshaft or of the internal combustion engine do not have to be taken into consideration since only the time until the breakaway of the crankshaft is considered.

To ascertain the natural frequency, the following differential equation of the belt drive is formed, neglecting damping effects:

$$J_{RSG} \cdot \ddot{\alpha}_{RSG} + \frac{E \cdot A}{2L_R} \cdot r_{RSG}^2 \cdot \alpha_{RSG} = 0,$$

where $r_{RSG}$ is radius of belt pulley 11 and $\alpha_{RSG}$ is angular acceleration.

Based on this, the natural frequency $$f_0 = \frac{\omega_0}{2\pi} = \frac{1}{T_0}, \text{ where } \omega_0 = \sqrt{\frac{\frac{E \cdot A}{2L_R} \cdot r_{RSG}^2}{J_{RSG}}}.$$

If according to alternative specific embodiments additional components, such as a water pump or air-conditioning compressor, are situated in the belt drive, this may be taken into consideration by adjusting the term $2L_R$. It may be adjusted, for example, to the sum of the span lengths of the slack and tight spans. In many applications, this corresponds approximately to the total length of the belt.

What is claimed is:

1. A method for starting an internal combustion engine using a starter generator to which the internal combustion engine is connected via a belt drive, the belt drive including a belt pulley of the starter generator, a belt pulley of the internal combustion engine, and a belt connecting the belt pulleys in a torque-transmitting manner, the method comprising:

operating the starter generator such that its drive torque output $M_0$ to the belt pulley of the starter generator is according to a drive torque curve by which, taking a gear ratio i of the belt drive into consideration, an output torque $M_1$ generated temporarily on the belt pulley of the internal combustion engine exceeds the drive torque output $M_0$ of the starter generator, such that $M_1 > M_0 * i$; and after the temporary exceedance, the output torque $M_1$ generated on the belt pulley of the internal combustion engine decaying over time from $M_1 > M_0 * i$ to the drive torque output $M_0$ of the starter generator taking the gear ratio i into consideration, such that $M_1$ decays to $M_0 * i$, as the starter generator operates;

wherein the drive torque curve according to which the starter generator operates is a linear drive torque curve having a torque gradient of at least $M_{max}/(0.5*T_0)$, where $M_{max}$ is a peak torque value, and $T_0$ is a period duration of a first natural frequency of the belt drive;

wherein during the operating of the starter generator, a transmitted peak torque of the starter generator is less than a breakaway torque of a crankshaft of the internal combustion engine.

2. The method of claim 1, wherein the temporary exceedance is by more than 40%.

3. The method of claim 1, wherein the temporary exceedance is by more than 50%.

4. The method of claim 1, wherein the operation of the starter generator is such that the drive torque output $M_0$ to the belt pulley of the starter generator increases from a torque of zero to a predefined setpoint drive torque value during a predefined acceleration duration.

5. The method of claim 4, wherein the acceleration duration is predefined as a function of the period duration $T_0$ of the first natural frequency of the belt drive.

6. The method of claim 5, wherein the acceleration duration is set to at most double the period duration $T_0$ of the first natural frequency of the belt drive.

7. The method of claim 5, wherein the acceleration duration is set to be at most equal to the period duration $T_0$ of the first natural frequency of the belt drive.

8. The method of claim 5, wherein the acceleration duration is set to half the period duration $T_0$ of the first natural frequency of the belt drive.

9. The method of claim 4, wherein the acceleration duration is at least 0.5 µs.

10. The method of claim 1, wherein the drive torque curve is predefined as a function of at least one variable, which is selected from the group consisting of a length of the belt span between the belt pulley of the starter generator and the belt pulley of the internal combustion engine, an axial rigidity of the belt, a moment of inertia of rotating elements of the starter generator and the belt pulley of the starter generator, and a radius of the belt pulley of the starter generator.

11. The method of claim 1, wherein the decaying is a function of damping by the belt drive and the internal combustion engine.

12. The method as recited in claim 1, wherein the drive torque output $M_0$ of the starter generator is a maximum peak torque output of the starter generator.

13. A device comprising:
processing circuitry; and
an interface to an engine-generator system that includes a starter generator to which an internal combustion engine is connected via a belt drive, the belt drive including (a) a belt pulley of the starter generator, (b) a belt pulley of the internal combustion engine, and (c) a belt connecting the belt pulleys in a torque-transmitting manner;

wherein the processing circuitry is configured to generate, and output to the engine-generator system, control output that operates the starter generator such that its drive torque output $M_0$ to the belt pulley of the starter generator is according to a drive torque curve by which, taking a gear ratio i of the belt drive into consideration, an output torque $M_1$ generated temporarily on the belt pulley of the internal combustion engine exceeds the drive torque output $M_0$ of the starter generator, such that $M_1 > M_0 * i$;

wherein after the temporary exceedance, the output torque $M_1$ generated on the belt pulley of the internal combustion engine decays over time from $M_1 > M_0 * i$ to the drive torque output $M_0$ of the starter generator taking the gear ratio i into consideration, such that $M_1$ decays to $M_0 * i$, as the starter generator operates;

wherein the drive torque curve according to which the starter generator operates is a linear drive torque curve having a torque gradient of at least $M_{max}/(0.5*T_0)$, where $M_{max}$ is a peak torque value, and $T_0$ is a period duration of a first natural frequency of the belt drive;

wherein during the operating of the starter generator, a transmitted peak torque of the starter generator is less than a breakaway torque of a crankshaft of the internal combustion engine.

14. The device of claim 13, wherein the decay is a function of damping by the belt drive and the internal combustion engine.

15. The device as recited in claim 13, wherein the drive torque output $M_0$ of the starter generator is a maximum peak torque output of the starter generator.

16. A non-transitory computer-readable medium on which are stored instructions that are executable by a processor, the instructions which, when executed by the processor, cause the processor to perform a method for starting an internal combustion engine using a starter generator to which the internal combustion engine is connected via a belt drive, the belt drive including a belt pulley of the starter generator, a belt pulley of the internal combustion engine, and a belt connecting the belt pulleys in a torque-transmitting manner, the method comprising:

operating the starter generator such that its drive torque output $M_0$ to the belt pulley of the starter generator is according to a drive torque curve by which, taking a gear ratio i of the belt drive into consideration, an output torque $M_1$ generated temporarily on the belt pulley of the internal combustion engine exceeds the drive torque output $M_0$ of the starter generator, such that $M_1 > M_0 * i$; and after the temporary exceedance, the output torque $M_1$ generated on the belt pulley of the internal combustion engine decaying over time from $M_1 > M_0 * i$ to the drive torque output $M_0$ of the starter generator taking the gear ratio i into consideration, such that $M_1$ decays to $M_0 * i$, as the starter generator operates;

wherein the drive torque curve according to which the starter generator operates is a linear drive torque curve having a torque gradient of at least $M_{max}/(0.5*T_0)$, where $M_{max}$ is a peak torque value, and $T_0$ is a period duration of a first natural frequency of the belt drive;

wherein during the operating of the starter generator, a transmitted peak torque of the starter generator is less than a breakaway torque of a crankshaft of the internal combustion engine.

17. The non-transitory computer-readable medium of claim 16, wherein the decaying is a function of damping by the belt drive and the internal combustion engine.

18. The non-transitory computer-readable medium of claim 16, wherein the drive torque output $M_0$ of the starter generator is a maximum peak torque output of the starter generator.

* * * * *